Patented Aug. 22, 1950

2,519,631

UNITED STATES PATENT OFFICE 2,519,631

CATALYTIC HYDROGENATION OF ALKENYL FURANS

John George Mackay Bremner, Frederick Starkey, and Dennis Albert Dowden, Norton-on-Tees, England, assignors to Imperial Chemical Industries Limited, a corporation of Great Britain No Drawing. Application June 10, 1946, Serial No. 675,842. In Great Britain June 11, 1945

8 Claims. (Cl. 260—345)

This invention relates to the catalytic hydrogenation of organic compounds.

In the catalytic hydrogenation of organic compounds containing two or more reducible groups, it is frequently desired to hydrogenate one or more of these groups while leaving one or more of the remaining reducible groups unhydrogenated. While with some of these compounds it is possible to achieve this end by the selection of a suitable catalyst and operating conditions, careful control of the latter is often essential.

We have now found that by carrying out the catalytic hydrogenation in the presence of ammonia or of an amine, it is possible to enhance the rate of hydrogenation of certain reducible groups relative to other reducible groups, and with some compounds even to achieve hydrogenation of some groups without appreciable hydrogenation of other groups.

According to the present invention in the catalytic hydrogenation of organic compounds having a reducible cyclic nucleus and one or more reducible side chains, particularly alkenyl furans hydrogenation of the reducible cyclic nucleus is suppressed by carrying out the hydrogenation in the presence of ammonia or of an amine.

The quantity of ammonia or amine present may vary over wide limits, according to the compound being hydrogenated and the operating conditions. Where the reducible group is a nitro group, and this is hydrogenated to an amino group, the resulting organic compound, being an amine, acts in suppressing the hydrogenation of the cyclic nucleus, but even in this case it is desirable to have present added ammonia or an amine. The effect of the presence of added ammonia in suppressing the hydrogenation of a reducible nucleus is illustrated by experiments in which an attempt was made to hydrogenate furfurylamine in the presence of ammonia at a temperature of 150° C. but no tetrahydrofurfurylamine was obtained. Under similar conditions, but in the absence of ammonia there was substantially complete conversion of the furfurylamine to tetrahydrofurfurylamine.

Lower alkyl amines such as diethylamine, triethylamine are convenient alternatives to ammonia but other amines such as aniline, furfurylamine and tetrahydrofurfurylamine may be employed.

The process of the present invention is illustrated by the following examples, as applied to compounds containing the furyl radicle.

Example 1

An autoclave of 1100 mls. capacity and provided with shaking mechanism was charged with 200 gms. of vinyl furan, 20 gms. of an aqueous solution of ammonia (0.88 specific gravity) and 20 gms. of reduced nickel-on-kieselguhr catalyst. Hydrogen was admitted into the autoclave until the gauge pressure was 50 atmospheres, after which the shaking mechanism was started up. Whenever the pressure in the autoclave fell to about 30 atmospheres, hydrogen was fed to the autoclave until the pressure was again 50 atmospheres. After 16 hours at room temperature, the temperature was raised to 50° C., and the experiment continued for a further 16 hours. The shaking mechanism was then stopped, the autoclave cooled and the product removed and filtered. The product, after removing the water, distilled within the range 90–91° C. giving a yield of 95% of ethyl furan.

Example 2

The experiment described in Example 1 was repeated, but the aqueous solution of ammonia was omitted from the materials charged to the autoclave. After 11 hours at room temperature, the temperature was raised to 50° C. and maintained there for 20 hours. The temperature was then raised to 80° C. and maintained there for 25 hours, but there was no absorption of hydrogen during this period. The product was found to contain ethyl tetrahydrofuran in 85% yield, and showed that in the absence of ammonia the furan nucleus had also been hydrogenated.

Example 3

200 gms. of vinyl furan, 20 mls. of diethylamine and 20 gms. of reduced nickel on kieselguhr catalyst were charged to the autoclave described in Example 1. The autoclave was charged with hydrogen to give a gauge pressure of 50 atmospheres and was then heated to 80° C. for 12 hours. Hydrogen was fed to the autoclave whenever the pressure fell to about 30 atmospheres. The product, after filtration and distillation showed a yield of 90% of ethyl furan.

Although the process of the present invention has been illustrated by reference to organic compounds containing the furyl radical, it should be understood that it is also applicable to organic compounds containing other cyclic radicals such as the phenyl radical.

In general, it is preferable to carry out the process of the present invention at elevated pressures and temperatures. It will be understood that the conditions used in the process will vary according to the organic compound being hydrogenated, the product desired and the activity of the catalyst chosen for use in the process. Suitable conditions are however easily determined by simple experiments.

While a wide variety of catalysts are suitable for use in the process of the present invention, we have found that satisfactory results are obtained with skeleton type nickel catalysts, nickel supported on kieselguhr and cobalt supported on kieselguhr.

We claim:

1. A process for the catalytic hydrogenation of alkenyl furans, comprising the step of carrying out the hydrogenation in the presence of an ammonia-type compound selected from the group consisting of ammonia and amines, whereby the side chain is hydrogenated to saturation while hydrogenation of the furan nucleus is suppressed, the ammonia-type compound remaining unchanged at the end of the reaction.

2. A process for the catalytic hydrogenation of alkenyl furans, comprising the step of carrying out the hydrogenation at elevated pressure in the presence of an ammonia-type compound selected from the group consisting of ammonia and amines, whereby the side chain is hydrogenated to saturation while hydrogenation of the furan nucleus is suppressed, the ammonia-type compound remaining unchanged at the end of the reaction.

3. A process for the catalytic hydrogenation of alkenyl furans, comprising the step of carrying out the hydrogenation at elevated pressure and temperature in the presence of an ammonia-type compound selected from the group consisting of ammonia and amines, whereby the side chain is hydrogenated to saturation while hydrogenation of the furan nucleus is suppressed, the ammonia-type compound remaining unchanged at the end of the reaction.

4. A process for the catalytic hydrogenation of vinyl furan, comprising the step of carrying out the hydrogenation in the presence of an ammonia-type compound selected from the group consisting of ammonia and amines, whereby the side chain is hydrogenated to saturation while hydrogenation of the furan nucleus is suppressed, the ammonia-type compound remaining unchanged at the end of the reaction.

5. A process for the catalytic hydrogenation of vinyl furan, comprising the step of carrying out the hydrogenation at elevated pressure in the presence of an ammonia-type compound selected from the group consisting of ammonia and amines, whereby the side chain is hydrogenated to saturation while hydrogenation of the furan nucleus is suppressed, the ammonia-type compound remaining unchanged at the end of the reaction.

6. A process for the catalytic hydrogenation of vinyl furan, comprising the step of carrying out the hydrogenation at a temperature within the range of 50° C. to 120° C. and at a pressure within the range of 30 to 80 atmospheres in the presence of an ammonia-type compound selected from the group consisting of ammonia and amines, whereby the side chain is hydrogenated to saturation while hydrogenation of the furan nucleus is suppressed, the ammonia-type compound remaining unchanged at the end of the reaction.

7. A process for the hydrogenation of alkenyl furans, comprising the step of carrying out the hydrogenation in the presence of a catalyst containing nickel and in the presence of an ammonia-type compound selected from the group consisting of ammonia and amines, whereby the side chain is hydrogenated to saturation while hydrogenation of the furan nucleus is suppressed, the ammonia-type compound remaining unchanged at the end of the reaction.

8. A process for the hydrogenation of vinyl furan, comprising the step of carrying out the hydrogenation at a temperature below 120° C. in the presence of a catalyst containing nickel and in the presence of an ammonia-type compound selected from the group consisting of ammonia and amines, whereby the side chain is hydrogenated to saturation while hydrogenation of the furan nucleus is suppressed, the ammonia-type compound remaining unchanged at the end of the reaction.

JOHN GEORGE MACKAY BREMNER.
FREDERICK STARKEY.
DENNIS ALBERT DOWDEN.

REFERENCES CITED

The following references are of record in the file of this patent:

UNITED STATES PATENTS

| Number | Name | Date |
|---|---|---|
| 2,207,071 | Reppe et al. | July 9, 1940 |

FOREIGN PATENTS

| Number | Country | Date |
|---|---|---|
| 412,914 | Great Britain | July 2, 1934 |

OTHER REFERENCES

Brudick et al.: Journal of American Chemistry Society, vol. 56, pages 438 to 441.